(12) United States Patent
Alo et al.

(10) Patent No.: US 7,382,632 B2
(45) Date of Patent: Jun. 3, 2008

(54) COMPUTER ACOUSTIC BAFFLE AND CABLE MANAGEMENT SYSTEM

(75) Inventors: Roland K. Alo, Cary, NC (US); David F. Champion, Durham, NC (US); Gerard F. Muenkel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 11/100,799

(22) Filed: Apr. 6, 2005

(65) Prior Publication Data

US 2006/0227526 A1 Oct. 12, 2006

(51) Int. Cl.
*H02B 1/01* (2006.01)
(52) U.S. Cl. .................. 361/825; 361/818; 361/816
(58) Field of Classification Search ................ 361/810, 361/752, 800, 816, 818, 825, 826, 679, 784, 361/683–687; 248/637, 638; 439/567, 527, 439/939; 312/223; 174/35 R, 51; 73/861
See application file for complete search history.

(56) References Cited

U.S. PATENT DOCUMENTS

| | | | |
|---|---|---|---|
| 4,215,761 A * | 8/1980 | Andrews .................... 181/152 |
| 4,403,271 A | 9/1983 | Flanigan et al. ............ 361/383 |
| 4,786,121 A | 11/1988 | Lyons ........................ 312/214 |
| 5,526,228 A * | 6/1996 | Dickson et al. ............. 361/695 |
| 5,596,483 A | 1/1997 | Wyler ........................ 361/683 |
| 5,957,556 A | 9/1999 | Singer et al. ............. 312/223.6 |
| 6,118,075 A * | 9/2000 | Baker et al. ............... 174/72 A |
| 6,398,149 B1 * | 6/2002 | Hines et al. ................. 242/399 |
| 6,621,692 B1 | 9/2003 | Johnson et al. ............. 361/683 |
| 6,953,896 B2 * | 10/2005 | Kleeberger et al. ........ 174/72 A |
| 7,026,553 B2 * | 4/2006 | Levesque et al. ........... 174/100 |

FOREIGN PATENT DOCUMENTS

JP 2004029513 1/2004

* cited by examiner

*Primary Examiner*—Hung S. Bui
(74) *Attorney, Agent, or Firm*—Harrington & Smith, PC

(57) ABSTRACT

A sound dampening system for a computer including a bracket and a plurality of acoustic shield members. The bracket is adapted to be fixedly connected to a housing of the computer. The bracket is adapted to extend rearward from the computer. The bracket comprises support surfaces adapted to support wires extending from the computer. The acoustic shield members are connected to the bracket. A first one of the acoustic shield members is removably connected to the bracket.

5 Claims, 3 Drawing Sheets

COMPUTER ACOUSTIC BAFFLE AND CABLE MANAGEMENT SYSTEM

BACKGROUND OF THE INVENTION

1. Field of the Invention

The present invention relates to computers and, more particularly, to a system for dampening sound emanating from a computer and supporting wires connected to a side of a computer.

2. Brief Description of Prior Developments

U.S. Pat. No. 4,786,121 discloses a protective enclosure for a computer with acoustic insulating material. U.S. Pat. No. 5,957,556 discloses a cable management system for a computer.

Computers, such as a tower model server for example, because of the increased heat output from the CPU, are requiring a greater throughput of air for cooling purposes. This means larger more powerful fans. This, in turn, makes for a larger acoustic signature. Sound levels on some systems are already such that they contravene standards for office usage, and sound baffles have to be fitted to the server. Such sound baffles are usually of metal or plastic with an acoustic foam lining. These covers make access to cables difficult. They are large, often awkwardly voluminous in shape, and must withstand the force of being pushed back against a wall.

There is a desire to provide a computer sound baffle for a fan of a computer which is smaller in size than conventional sound baffles. There is also a desire to provide a computer sound baffle for a fan of a computer which is easily removable for servicing components of the computer, such as at the rear side of a tower or mini-tower computer.

SUMMARY OF THE INVENTION

In accordance with one aspect of the present invention, a computer cable management and support bracket is provided comprising at least one connection section adapted to be fixedly connected to a housing of a computer, wherein the housing forms a rear end of the computer; a support section extending from the at least one connection section, the support section comprising support surfaces adapted to support wires extending from the rear end of the computer and extending through the support section. When the bracket assembly is connected to the computer, the support section extends rearward from the rear end of the computer. The support section is adapted to support at least one acoustic shield thereon.

In accordance with another aspect of the present invention, a computer acoustic shielding system is provided comprising a plurality of acoustic shield members adapted to be connected to, and extend from, a rear side of a computer housing. A first one of the acoustic shield members is adapted to be removed from the computer housing separately from a second one of the shield members.

In accordance with another aspect of the present invention, a sound dampening system for a computer is provided including a bracket and a plurality of acoustic shield members. The bracket is adapted to be fixedly connected to a housing of the computer. The bracket is adapted to extend rearward from the computer. The bracket comprises support surfaces adapted to support wires extending from the computer. The acoustic shield members are connected to the bracket. A first one of the acoustic shield members is removably connected to the bracket.

In accordance with one method of the present invention, a method of connecting a sound dampening system to a computer is provided comprising connecting a bracket to a housing of the computer, wherein the bracket extends reward from a rear side of the computer; and connecting a plurality of acoustic shield members to the bracket. At least one of the acoustic shield members is removable from the bracket for access to the rear side of the computer.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
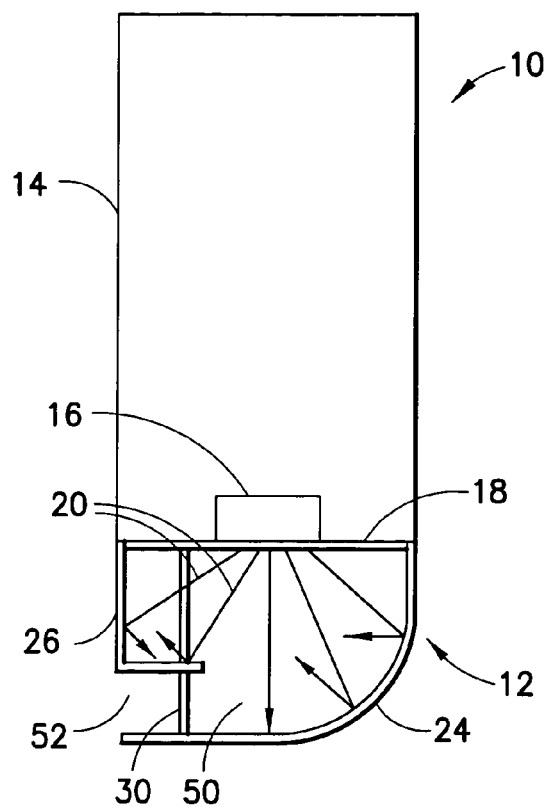
FIG. 1 is a schematic cross sectional view of a computer with a sound dampening system incorporating features of the present invention.

Referring to FIG. 1, there is shown a schematic cross sectional view of a computer 10 with a sound dampening system 12 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The computer 10 preferably comprises a tower or mini-tower computer, such as a server for example. The computer 10 is substantially conventional with an outer housing or case 14. Located inside the housing 14 is at least one processor and at least one hard drive (not shown). The processor(s) and hard drive(s) generate heat during operation. The computer 10 comprises a fan 16 located at the rear side 18 of the housing. The fan 16 propels hot air inside the housing out of the rear side 18 of the housing. The fan 16 generates noise or sound during its operation. This noise exits the rear side of the housing as shown by arrows 20. As noted above, computers, such as a tower model server for example, because of the increased heat output from the CPU, are requiring a greater throughput of air for cooling purposes. This means larger more powerful fans. This, in turn, makes for a larger acoustic signature.

Figure 3:
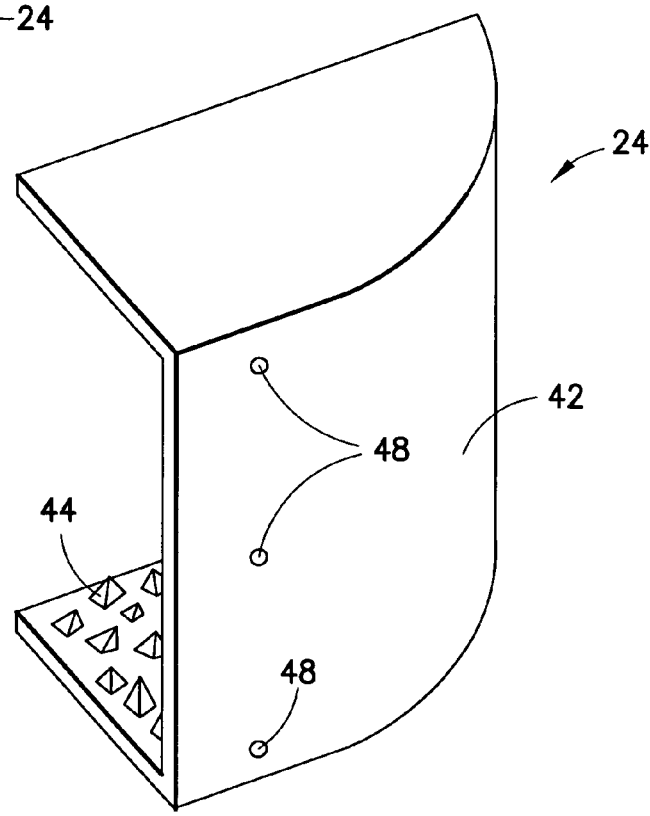
FIG. 3 is a perspective view of a first one of the acoustic shield members shown in FIG. 1.
Figure 2:
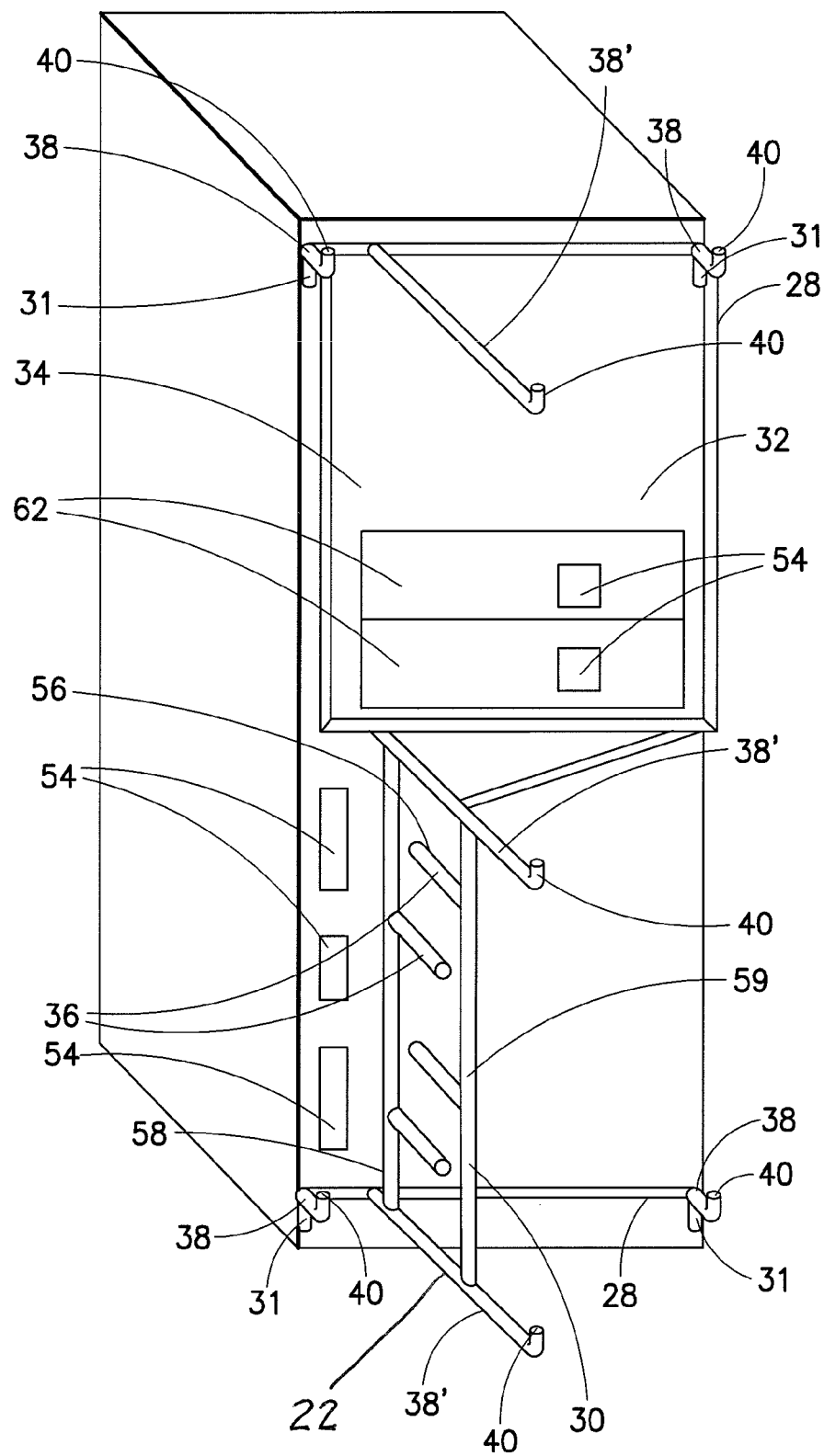
FIG. 2 is a perspective view of the computer and sound dampening system shown in FIG. 1 with the acoustic shield members removed.
Figure 4:
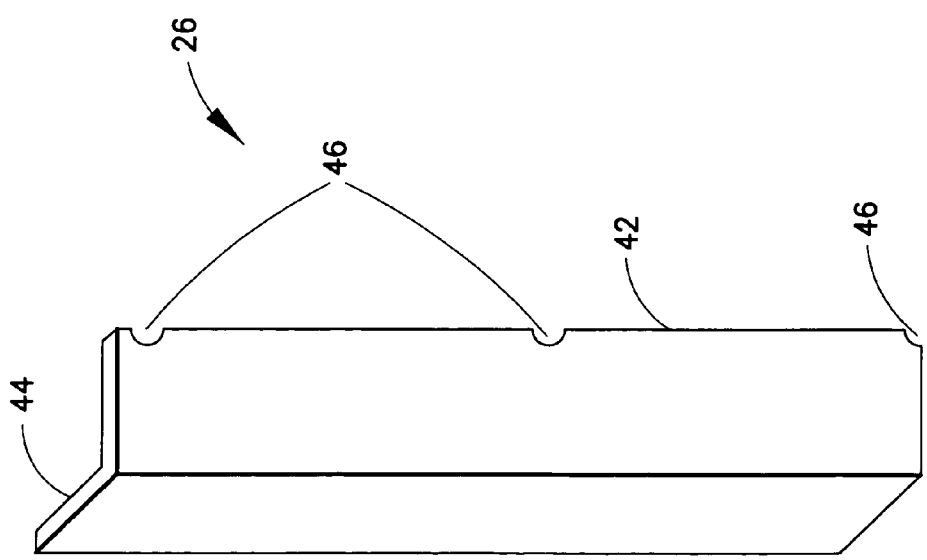
FIG. 4 is a perspective view of a second one of the acoustic shield members shown in FIG. 1.

To address the problem of larger acoustic signatures or noise from larger more powerful fans, the sound dampening system 12 is provided. Referring also to FIGS. 2-4, the sound dampening system generally comprises at least one bracket 22, and a plurality of acoustic shield members 24, 26. In an alternate embodiment, a single acoustic shield could be provided with shield member sections which are movable relative to each other, such as at a hinge.

In this embodiment, the sound dampening system has a single bracket 22 which is attached to the rear side of the housing 14. The bracket has a wire form, but in alternate embodiments any suitable form could be provided. The bracket 22 is adapted to connect and support the shield members 24, 26 on the housing 14. The bracket 22 comprises a connection section 28 and a support section 30. The connection section 28 has fastener receiving areas 31 for receiving fasteners, such as screws, which are fastened into the rear side of the housing 14 to attach the bracket to the housing. In an alternate embodiment, any suitable system for fixedly attaching the bracket(s) to any suitable location(s) on the housing could be provided; so long as the bracket(s) extend in a rearward direction from the housing. In the embodiment shown in FIG. 2, the connection section 28 has an open section 32. The open section 32 is located aligned with a section 34 of the computer 10. The section 34 can comprise ends of components 62 such as power supplies and blind dock PCI cards for example. The open section 32 allows access to these components in the rear of the computer for quick and easy removal without having to remove the bracket 22 from the housing 14.

The support section 30 generally comprises cable or wire support beams 36. The beams 36, in this embodiment, are intermixed forward and rearward projecting cantilevered beams forming cable or wire support surfaces 56 on their tops sides. The beams 36 extend from front and rear sections 58, 60 of the support section. The support section 30 also comprises shield support beams 38 and 38'. The beams 38 and 38' extend rearward in a general cantilever fashion. Ends 40 of the shield support beams 38 and 38' have fastening sections to attach to the shield members 24, 26. In this embodiment the ends merely comprise upturned hook shaped ends which form the fastening sections. However, any suitable system for attaching the shield members to the bracket(s) could be provided.

In this embodiment the shield members 24, 26 each preferably comprise a shell 42 and an inner lining 44 of sound dampening material such as foam for example. In an alternate embodiment, each shield member could comprise a one piece member made of a single material. The shells 42 could be made of any suitable material such as plastic or metal for example. In the embodiment shown, the foam lining 44 has a sound dampening surface shape with peaks and valleys. However, any suitable liner surface shape(s) could be provided.

The second shield member 26 is removably attached to the ends 40 of the beams 38 at the left side of the computer's rear side. Channels 46 can preferably snap onto the middles of the center beams 38'. The first shield member 24 is removably attached to the ends 40 of the other beams; at the right side and the center beams. The first shield member 24 has holes 48 to allow the ends 40 of the center long beams 38' to extend to the exterior of the first shield member. However, in an alternate embodiment, ends of the beams 38' might not extend to the exterior of the first shield member. When the first and second shield members 24, 26 are attached to the bracket 22, they form a substantially enclosed area 50 (see FIG. 1) with an air outlet 52. The air outlet 52 is not in a direct path from the fan 16. Thus sound waves 20 are deflected off of the lining 44 at least once before exiting the air outlet 52.

The sound dampening system 12 can also provide a cable or wire management and support system. More specifically, the computer comprises electrical connectors 54 at its rear side (see FIG. 2). For example, the electrical connectors could be USB connectors, or connectors for a monitor, mouse, keyboard, printer, or Ethernet connection. The wires or cables connected to these electrical connectors are able to exit the enclosed area 50 at the air outlet 52. The beams 36 are adapted to support at least some of the wires and cables as they make the turn around the end of the second shield member 26, and can also support the wires and cables when one or more of the shield members 24, 26 are removed to allow for easier attachment of the shield members to the computer without substantial interference from the wires and cables.

As noted above, one embodiment of the present invention envisages a wire form metal frame as the bracket onto which the acoustic shielding may be hung. The wire frame of the bracket 22 can provide the strength if the machine is pushed back against the wall, allowing the shielding to be lighter and in two parts so that it is easy to remove for service and cable access purposes. If formed correctly the wire frame can also double as a cable management system.

The acoustic shielding can be lined with sound absorbing foam. Sound can be bounced back into containment area formed by the acoustic shielding. The cable management bracket maybe of any design. The embodiments shown in the drawings are purely illustrative. A cable management bracket can be attached to the rear of the server. The bracket may be of a variety of designs suited to the particular size and configuration of components within the server. The bracket can be screwed, or by some other method firmly attached, to the rear of the server. The bracket can have attachment points on it so that the acoustic shielding can be hung or hooked onto it. The shielding may be of plastic or metal or some other dense material and can be lined on the inside with acoustic absorbent foam (such as about an inch thick for example). As is shown in the figures, the shielding may be in two parts, but preferably designed such that there is no direct route from the rear side of the server to the outside. Sound is then bounced off the acoustic foam and its intensity reduced before it can escape.

With the present invention, the shielding is quick and easy to remove, which makes access to cables and components in the rear of the system both quicker and easier. This, in turn, can facilitate designating such components as mandatory Customer Replaceable Units (CRUs). Examples of such components include power supplies and blind dock PCI cards. The bracket, if properly designed can provide a method by which customers can dress and manage the cables coming out of the server. Because the shielding does not have to withstand pressures or forces such as being pushed back against a wall (the force being transferred to the cable management bracket in the present invention), it is possible to explore lighter and cheaper materials for the shielding than those currently in use in conventional computer rear end acoustic shielding.

Figure 5:
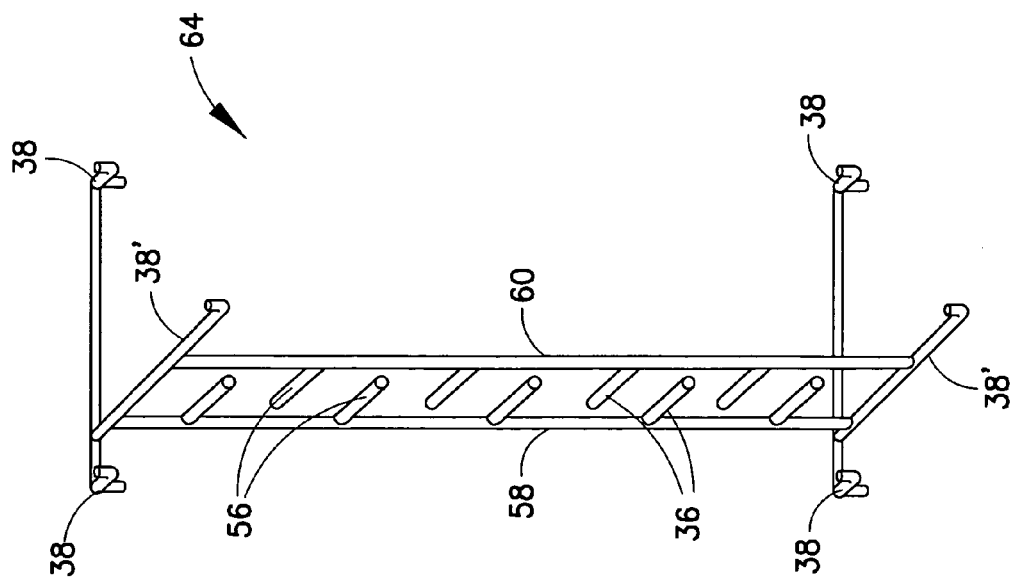
FIG. 5 is a perspective view of an alternate embodiment of the bracket of a sound dampening system incorporating features of the present invention.

Referring now also to FIG. 5, an alternate embodiment of the bracket is shown. In this embodiment the bracket 64 is a metal wire form member with only two long beams 38' and four short beams 38. The front and rear members 58, 60 extend the entire height of the bracket 64. The wire support beams 36, in this embodiment, are intermixed forward and rearward projecting cantilevered beams forming cable or wire support surfaces 56 on their tops sides. The beams 36 extend from front and rear sections 58, 60 of the support section. This is just another example of a bracket which could be used both as a cable management and support bracket as well as a mounting structure for acoustic shield member(s). In alternate embodiments, any suitable size or shape of the bracket(s) could be provided, and any suitable size or shape of the acoustic shield members to be attached to the bracket(s) could be provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A sound dampening system for a computer comprising:
   a computer cable management and support bracket comprising:
   at least one connection section adapted to be fixedly connected to a housing of a computer, wherein the housing forms at least a portion of a rear end of the computer;
   a support section extending from the at least one connection section, the support section comprising support surfaces adapted to support wires extending through the support section from the rear end of the computer,
   wherein, when the bracket assembly is connected to the computer, the support section extends rearward from the rear end of the computer, wherein the support section is adapted to support at least one acoustic shield thereon, wherein support surfaces of the support section are formed by forward projecting and rearward projecting cantilevered beams; and
   at least one acoustic shield member connected to the bracket, wherein the at least one acoustic shield member is removably connected to the bracket, wherein the at least one acoustic shield member comprises a plurality of acoustic shield members,
   wherein the bracket forms a structural frame for the acoustic shield members and prevents the acoustic shield members from being substantially damaged if the sound dampening system, attached a rear end of a computer, is pushed against a wall,
   wherein a first one of the shield members is on a first lateral side, a second one of the shield members is on a second lateral side, and an air outlet is formed at a gap between the two shield members at the first lateral side.

2. The sound dampening system of claim 1 wherein the connection section comprises fastener receiving areas for receiving fasteners which are fastened into the housing of the computer.

3. The sound dampening system of claim 1 wherein the bracket comprises a wire frame member.

4. A method of connecting a sound dampening system to a computer comprising:
   connecting a bracket to a housing of the computer, wherein the bracket extends rearward from a rear side of the computer; and
   connecting at least two acoustic shield members to the bracket, wherein the acoustic shield members are separately removable from the bracket for access to the rear side of the computer,
   wherein connecting the acoustic shield members to the bracket comprises connecting a first one of the acoustic shield members over a first lateral side of the bracket and connecting a second one of the acoustic shield member over a second lateral side of the bracket, wherein an air outlet is formed in a gap between the first and second shield members at the first lateral side.

5. A method of replacing a component in a computer comprising:
   connecting the sound dampening system to the computer as in claim 4;
   removing at least one of the acoustic shield members from the bracket to access the rear side of the computer; and
   removing the component from the computer without disconnecting the bracket from the housing of the computer.

* * * * *